US011939233B2

United States Patent
Alghunaimi et al.

(10) Patent No.: US 11,939,233 B2
(45) Date of Patent: Mar. 26, 2024

(54) OIL-WATER SEPARATION SYSTEM USING HYDROPHOBIC/HYDROPHILIC MATERIALS FOR CAPACITY INCREASE AND IMPROVING PRODUCED WATER QUALITY

(71) Applicant: SAUDI ARABIAN OIL COMPANY, Dhahran (SA)

(72) Inventors: Fahd Ibrahim Alghunaimi, Dhahran (SA); Young Chul Choi, Dhahran (SA); Olanrewaju M. Oshinowo, Dhahran (SA); Hasan A. Al Abdulgader, Dammam (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 104 days.

(21) Appl. No.: 17/643,699

(22) Filed: Dec. 10, 2021

(65) Prior Publication Data
US 2023/0183094 A1 Jun. 15, 2023

(51) Int. Cl.
*C02F 1/24* (2023.01)
*B01D 17/02* (2006.01)
(Continued)

(52) U.S. Cl.
CPC .......... *C02F 1/006* (2013.01); *B01D 17/0211* (2013.01); *B01D 17/0214* (2013.01);
(Continued)

(58) Field of Classification Search
CPC .... C02F 1/006; C02F 1/24; C02F 1/40; C02F 2301/08; C02F 2101/32; C02F 2101/325;
(Continued)

(56) References Cited

U.S. PATENT DOCUMENTS 5,132,010 A * 7/1992 Ossenkop .......... B01D 17/0214
210/522
5,149,443 A * 9/1992 Varnam ................ E02B 15/046
210/776
(Continued)

FOREIGN PATENT DOCUMENTS

CN 207903949 U * 9/2018
CN 111924989 A * 11/2020 ................ C02F 9/00
(Continued)

OTHER PUBLICATIONS

English Translation of Liu et al Patent Publication CN111924989A, published Nov. 2020. (Year: 2020).*
(Continued)

*Primary Examiner* — Joseph W Drodge
(74) *Attorney, Agent, or Firm* — Osha Bergman Watanabe & Burton LLP

(57) ABSTRACT

An oil-water separation system including a vessel for receiving an oil-water mixture and passing a treated water having a lower concentration of oil than the oil-water mixture. The system further includes a first overflow baffle for directing the oil-water mixture fluid flow over the first overflow baffle, and a first underflow baffle positioned downstream along a fluid flow pathway of the first overflow baffle for directing the oil-water mixture fluid flow under the first underflow baffle, and a second overflow baffle positioned downstream along the fluid flow pathway of the first underflow baffle having a mesh with a plurality of perforations which directs fluid flow over the second overflow baffle and through the plurality of perforations. The second overflow baffle permits a water portion of the oil-water mixture to traverse through the mesh and an oil portion of the oil-water mixture to traverse over the mesh.

19 Claims, 4 Drawing Sheets

(51) Int. Cl.
*C02F 1/00* (2023.01)
*C02F 1/40* (2023.01)

(52) U.S. Cl.
CPC .................. *C02F 1/24* (2013.01); *C02F 1/40* (2013.01); *C02F 2301/08* (2013.01)

(58) Field of Classification Search
CPC ............ B01D 17/0211; B01D 17/0214; B01D 21/0039; B01D 21/0042; B01D 21/0045; B01D 21/0066; B01D 35/027; B01D 35/0273; B01D 36/04; B01D 17/0208; B01D 17/04; B01D 17/045
USPC ....... 210/521, 522, 540, 776, 799, 800, 801, 210/802
See application file for complete search history.

(56) References Cited

U.S. PATENT DOCUMENTS

| | | | | |
|---|---|---|---|---|
| 5,520,825 | A * | 5/1996 | Rice | B01D 17/045 |
| | | | | 210/DIG. 5 |
| 5,928,524 | A | 7/1999 | Casola | |
| 7,044,308 | B2 * | 5/2006 | Benson | B01D 21/2433 |
| | | | | 210/534 |
| 9,833,727 | B1 * | 12/2017 | Ball, IV | B01D 17/0217 |
| 10,220,351 | B2 | 3/2019 | Tuteja et al. | |
| 10,899,634 | B2 | 1/2021 | Rabe et al. | |
| 11,090,581 | B1 | 8/2021 | Oshinowo | |
| 2004/0159606 | A1 * | 8/2004 | Thacker | B01D 17/045 |
| | | | | 210/538 |
| 2010/0326922 | A1 * | 12/2010 | Varanasi | B01D 17/0211 |
| | | | | 210/708 |
| 2019/0345042 | A1 | 11/2019 | Toews et al. | |
| 2021/0062355 | A1 | 3/2021 | Alghunaimi et al. | |

FOREIGN PATENT DOCUMENTS

| | | |
|---|---|---|
| WO | 2011000044 A1 | 1/2011 |
| WO | 2013167358 A1 | 11/2013 |
| WO | 2015026722 A1 | 2/2015 |

OTHER PUBLICATIONS

Wilkinson, Derek, et al. "Baffle plate configurations to enhance separation in horizontal primary separators", Chemical Engineering Journal, Journal 77, Elsevier Science S.A. Jun. 15, 2000, pp. 221-226 (6 pages).
And, By. "Horizontal Three Phase Separator Part 2", Oil and Gas Separator, URL: http://www.oilngasseparator.info/oil-handling-surfacefacilities/oil-and-water-separation/horizontal-three-phase-separator-part-2.html. Aug. 21, 2009, pp: 1-7 (7 pages).
"API oil-water separator", Wikipedia, Retrieved from the Internet: URL: https://en.wikipedia.org/wiki/API_oil%E2%80%93water_separator. Jul. 16, 2021, pp. 1-4 (4 pages).
Schultz, Tom. "Petroleum Refinery, Ethylene and Gas Plant Wastewater Treatment Presentation", Wastewater Treatment, Treatment Options and Key Design Issues, Siemens. URL:http://www.sawea.org/pdf/waterarabia2013/Workshops/Basic-Industrial-Wastewater-Treatment-Workshop.pdf. 2006, pp. 1-94 (94 pages).
Shariff, Maher M., et al. "Debottlenecking Water-Oil Separation with Increasing Water Flow Rates in Mature Oil Fields", 5th Water Arabia 2017 Conference and Exhibition. Oct. 2017, pp. 1-26 [26 Pages].

* cited by examiner

OIL-WATER SEPARATION SYSTEM USING HYDROPHOBIC/HYDROPHILIC MATERIALS FOR CAPACITY INCREASE AND IMPROVING PRODUCED WATER QUALITY

BACKGROUND

Considerable amounts of water can be produced as a by-product of oil and gas production processes. The produced water is treated so that it may be, for example, safely discharged into a body of water or re-injected into a reservoir. Produced water treatment may include various processes to separate undesirable substances from the produced water. Some examples include de-oiling and removing total dissolved solids.

Water-oil separators (WOSEP) are vessels that use internal structures and gravity to separate water from oil. The process utilizes the difference in density and general immiscibility of the two fluids to aid in separation.

The water effluent from a WOSEP is generally disposed of using deep well injection. The objective of a WOSEP is to remove oil from a water feed before discharging the water. Oil is typically removed by exploiting the physical phenomena: density difference between oil and water and the buoyancy of oil in water.

SUMMARY

Embodiments herein relate to an oil-water separation system. The oil-water separation system includes a vessel for receiving an oil-water mixture and passing a treated water having a lower concentration of oil than the oil-water mixture. The system further includes a first overflow baffle for directing the oil-water mixture fluid flow over the first overflow baffle, and a first underflow baffle positioned downstream along a fluid flow pathway of the first overflow baffle for directing the oil-water mixture fluid flow under the first underflow baffle, and a second overflow baffle positioned downstream along the fluid flow pathway of the first underflow baffle having a mesh with a plurality of perforations which directs fluid flow over the second overflow baffle and through the plurality of perforations. The second overflow baffle permits a water portion of the oil-water mixture to traverse through the mesh and an oil portion of the oil-water mixture to traverse over the mesh.

Embodiments herein relate to an oil-water separation system. The oil-water separation system includes a vessel for receiving an oil-water mixture and passing a treated water having a lower concentration of oil than the oil-water mixture. The system also includes a first overflow baffle for directing the oil-water mixture fluid flow over the first overflow baffle, a first underflow baffle positioned downstream of the first overflow baffle in the direction of fluid flow for directing the oil-water mixture fluid flow under the first underflow baffle, and a second overflow baffle positioned downstream along the fluid flow pathway of the first underflow baffle for directing fluid flow over the second overflow baffle. The second overflow baffle includes a first portion being attached to the first overflow baffle at a level above a bottom of the vessel and below a bottom end of the first underflow baffle, and a second portion being attached to the first portion and being positioned downstream of the first underflow baffle in the direction of fluid flow. The system also includes a water exit port located below the first portion of the second overflow baffle.

Other aspects and advantages will be apparent from the following Detailed Description and the appended Claims.

DETAILED DESCRIPTION

Figure 1:
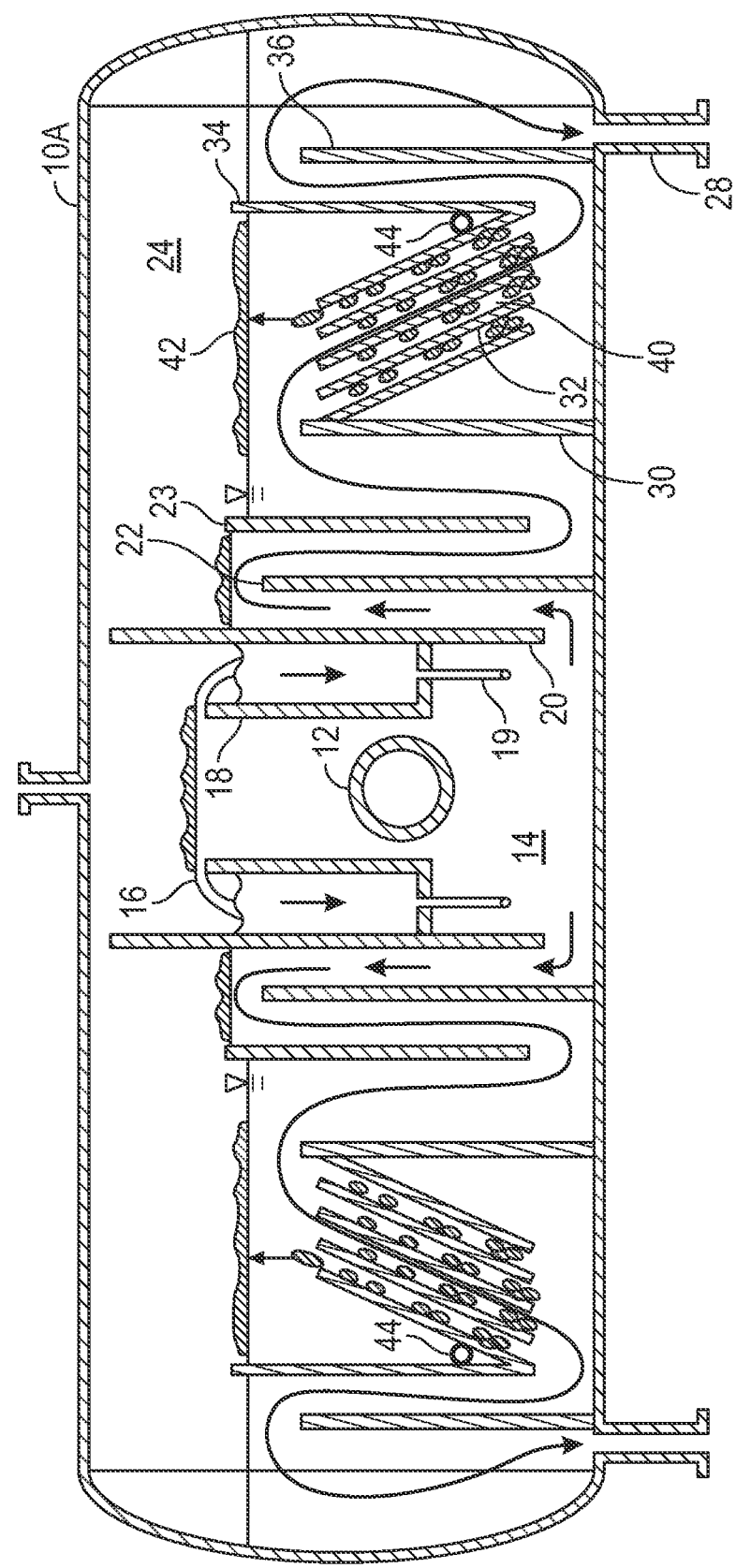
FIG. 1 is an internal diagram of a water-oil separator (WOSEP) with an internal baffle arrangement under flow conditions according to one or more embodiments disclosed.

For the purpose of this description, a single reference number will be assigned to a line as well as a stream carried in that line. Same reference numbers refer to similar components. The person skilled in the art will readily understand that while the design is illustrated referring to one or more specific combinations of features and measures many of those features and measures are functionally independent from other features and measures. Such features and measures may be equally or similarly applied independently in other embodiments or combinations.

This disclosure describes systems for and methods of oil and water separation. In particular, this disclosure describes separating oil and water from an oily water stream. The oil phase is dispersed in the bulk water phase. The oil and water separation includes velocity reduction of the fluid stream, flow conditioning, droplet coalescing, oil disengagement, and collection.

Using any one of several presented baffle configurations in a water-oil separators (WOSEP) may result in processing capacity and throughput of produced water increase in comparison to conventional separators while maintaining consistent oil removal efficiency. In one or more embodiments, the apparatus described may be implemented as a retrofit option for existing separator vessels. Such a configurational difference may increase the separator throughput, reduce oil concentrations in the treated water, or both. In one or more embodiments, the apparatus described may be implemented in new WOSEPs.

One of ordinary skill will know that larger oil droplets are easier to remove from water since the larger droplets will have a greater relative buoyancy force to separate from the bulk water flow. Small oil droplets have a size in the range of 2 to 250 μm (micrometers) may more easily stay with the bulk flow by having less force to lift upwards. Oil removal in water-oil separators is achieved by gravity separation with sufficient residence time so that even small oil droplets can float upwards and be separated within the vessels. WOSEPs typically receives the produced water effluent from upstream multiphase separators (gas-oil-water) include a high-pressure/high-temperature (HPPT) separators and from crude dehydrations vessels including dehydrators or desalters. The WOSEPs may be considered the primary produced water treatment stage with the main function of reducing the oil-in-water concentration in the produced water stream. Accordingly, the water stream entering the WOSEP may still contain in a range of from about 100 to 10,000 ppm (parts per million) of small oil droplets, which are more difficult to remove during primary separation. The target discharge quality at the WOSEP outlet is in a range of from about 20 to 500 ppm of the oil-in-water consisting of small oil droplets. Reducing the concentration of small oil droplets down to this level may make the produced water suitable for disposal.

When the residence time for some portion of the flow in the WOSEP is shortened, such as by increasing flowrate or by short circuiting, insufficient oil droplet separation may occur. WOSEPs are configured with a torturous fluid flow pathway to narrowly distribute the residence time within the vessel versus simply permitting the fluid flow to be in a mixed compartment straight from entry to exit. Stated differently, the torturous fluid flow pathway may narrow the mean residence time for the various fluid flow pathways. A more torturous fluid flow pathway provides the opportunity for the oil to coalesce and rise to the surface of the bulk phase utilizing several effects, including greater buoyancy for larger oil droplets in water and gravity separation. Compared to solid particles, the density difference between oil and water is insufficient to permit immediate separation; some period is required for this to naturally occur. But when flow rates are elevated compared to design or when the fluid flow pathway is not configured such that the small size of oil droplets are permitted to separate properly, producing an acceptably low amount of oil with the effluent water is difficult to achieve. Preventing short-circuiting and narrowly distributing the residence time by decreasing fluid flow rate is the only immediate solution to achieve appropriate levels of oil removal form a given WOSEP.

Increasing fluid flow rates may also cause another problem in a given WOSEP. With increasing fluid flow, the dominant fluid flow may "short-circuit" the desired fluid flow pathway within the WOSEP. That is, the dominant fluid flow pathway may be directed towards the outflow of the WOSEP instead of permitting fluid to be scattered and distributed into lower flow rate areas of the vessel, such as a surge compartment. The surge compartment of a WOSEP is supposed to act as a volume where such phase and gravity separation may occur; however, with increased fluid flows, such residential volume is merely bypassed for the outlet. The result is a drastic reduction in residence time for some portions of the flow that may result in a significant reduction in effluent water quality. In WOSEPs that do not have high residence time, a significant amount of oil may be retained in the produced water. At the same time, however, part of the surge compartment may have "dead" or stagnant volumes that do not circulate well—portions of the volume being fluidly bypassed by the dominant fluid flow pathway to the egress.

Alternate baffle configurations downstream of a first underflow baffle in a WOSEP may prevent many of these problems, especially the issue of fluid flow bypass in the surge compartment at increased fluid flow rates, and permit the natural phenomena between oil and water to properly permit disassociation of small water droplets from the introduced mixed water stream.

By introducing additional baffles or baffle-like structures, the tortious fluid flow pathway that the bulk fluid must flow through may be lengthened. The water quality, the process capacity of WOSEPs, or both, may be improved by using one of several structural configurations that provide for alternative internal fluid flow pathways in the surge compartment of the WOSEP. According to one or more embodiments disclosed, alternative flow pathways may provide a better distribution of the mean residence time to permit the oil droplets to aggregate and rise to the top of the bulk fluid at the oil-water interface in the surge compartment before the water exits the WOSEP versus traditional surge compartment configurations.

According to one or more embodiments disclosed are WOSEPs with alternative surge compartment configurations. The flow capacity of the embodiment system may realize greater fluid handling capacity with the same water output quality without resulting in increased facility size or footprint. Or, the increased flow capacity of the WOSEPs may be utilized to provide improve the produced water quality over those prior art WOSEPs with older surge compartment configurations. Using such alternative fluid flow pathways, such retrofitted WOSEPs may be operated at similar inlet and outlet effluent compositions without additional or expanded facilities.

FIG. 1 is an internal diagram of a water-oil separator (WOSEP) with a first alternate internal baffle arrangement under flow conditions. The oily produced water from the upstream multiphase (gas-oil-water) or crude dehydration vessel enters the WOSEP 10 through a feed inlet distributor assembly 12 into a separation compartment 14. The oil floats to the oil-water interface 16 in the separation compartment 14 and is skimmed off into the oil collector or oil bucket 18. The oily water oil collector or oil bucket 18 is returned to an upstream gas-liquid separation vessel through outlet line 19. The treated water continues under the oil baffle 20, over the water weir or first overflow baffle 22, under the underflow baffle 23, and into the surge compartment 24. The water level is controlled in the surge compartments 24 using a level controller 26. The treated produced water passes out of WOSEP 10 via the water exit port 28 and may be fed downstream for disposal or injection.

There may be one or more skim nozzles (not illustrated) at different elevations in the surge compartment. The oil skimming nozzles are manually operated to remove accumulated oil floating in the surge compartment to the sewer or other secondary treatment.

An oil skimming trough (not illustrated) may be positioned within the vessel. The oil skimming trough may span longitudinally across the vessel and downwardly sloped with respect to gravity toward an inner surface of the vessel. This configuration may allow the oil skimming trough to skim oil from an oil-water interface layer formed at the top of the bulk fluid within the vessel and above a top of the second overflow baffle and below a top of the first underflow baffle. Oil may collect at this interface and be removed using the oil skimming trough and oil skimming nozzles.

FIGS. 1-5 illustrate different surge compartment configurations for the oil-water separators according to one or more embodiments. As illustrated in FIG. 1, embodiment systems may use two or more parallel plates to lengthen the internal fluid flow pathway. While illustrated with the first overflow baffle and the first underflow baffle, the downstream baffle structures disclosed in FIGS. 1-5 may be disposed in any type of horizontal separator. For example, the vessel may be equipped with a different distributor assembly or primary oil collector.

In vessel 10A as shown in FIG. 1, after the fluid flow is directed under the first underflow baffle 23 the fluid flow pathway is toward an upper portion of the surge compartment 24 and over a second overflow baffle 30. The fluid flow pathway may then be toward an upper portion of two or more parallel plates 32. The two or more parallel plates 32 may serve multiple purposes. A pair of parallel plates 32 define a small channel 40 in-between where fluid may pass. The two or more parallel plates 32 may reduce the velocity of the oil droplets and allow for the oil to agglomerate on the surface of the two or more parallel plates in small channels 40. The oil droplets may collect and agglomerate on the underside of the parallel plates 32. As the oil droplets increase in size, the relative buoyancy increases. In this way, the larger oil droplets 42 may mobilize upward, detach from a plate at the upper edge, and rise against the fluid flow to the oil-water interface 16 in the surge compartment 24.

After the water exits the bottom side of the two or more parallel plates 32, the water is directed under a second underflow baffle 34 and over a third overflow baffle 36 into the terminal portion of the surge compartment 24. The water then passes to exit through water exit port 28 with an acceptable oil concentration. A portion of the oil may also accumulate in a dead space located between the terminal parallel plate 32 and the second underflow baffle 34. This accumulated oil may be removed through a sludge port 44.

The two or more parallel plates 32 may also be coated in a copper-based, hydrophobic material. Such a coating may enhance the initial attachment of the oil droplets to the coating surface of the parallel plates 32 as the hydrophobicity of the material may reduce the tendency for water to drag on the surface of the plates. Such copper-based hydrophobic material may be similar to that disclosed in U.S. Pat. No. 11,078,589.

Figure 2:
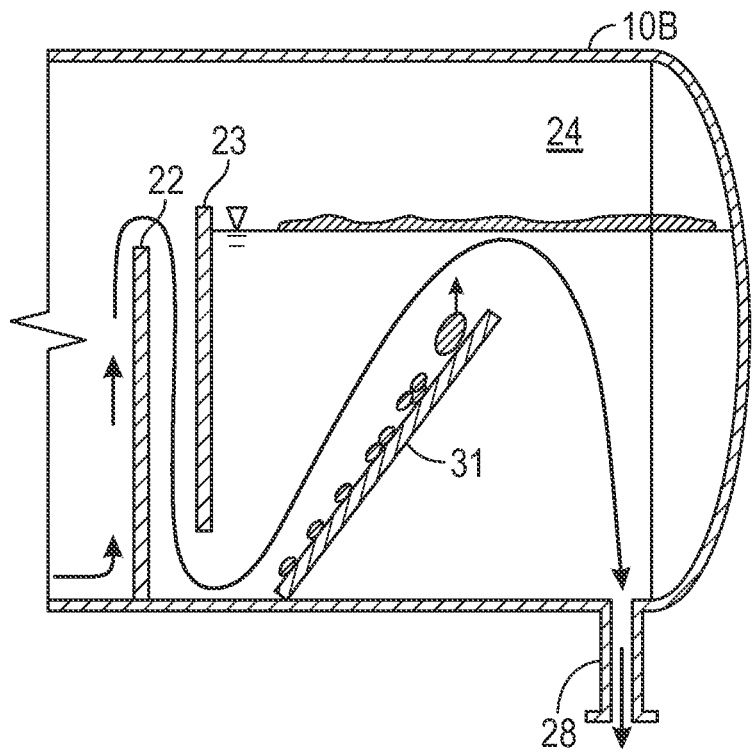
FIG. 2 is an illustration of one end of a second embodiment WOSEP with an alternate baffle arrangement under flow conditions according to one or more embodiments disclosed.

FIG. 2 is an illustration of one end of a second embodiment WOSEP with an alternate baffle design under flow conditions according to one or more embodiments disclosed. Although the WOSEP configurations in FIG. 1-5 are represented and described as in terms of being symmetrical, dual flow direction separators, for ease of discussion FIGS. 2-5 are shown with only one end. One of ordinary skill in the art may easily envision such configurations to symmetrical, dual flow direction separators. As well, the surge compartment configurations illustrated may also be adapted for non-symmetric or single flow direction vessels and are envisioned. In addition, such configurations may also be adapted to vertical type separators and are fully envisioned.

The configuration of vessel 10B utilizes a second overflow baffle 31 disposed in the surge compartment 24 such that the bulk water phase takes a narrowly distributed fluid flow pathway before reaching the water exit port 28. The second overflow baffle 31 may be disposed in the surge compartment 24 at an angle relative to the first overflow baffle 22 and the first underflow baffle 23. The angle of the second overflow baffle 31 is disposed at an acute angle from 0-90°, exclusive. In one or more embodiments, the angle may be from 30-60°, or from 40-50°. By being disposed at such an angle, the second overflow baffle 31 may increase the residence time of the shortest fluid flow pathway by physically preventing direct "short circuiting" from the bottom of first underflow baffle to the water exit port 28. The second overflow baffle 31 may also provide a surface on which the small oil droplets may accumulate, mobilize, increase in size, and more easily detach and float to the top of the fluid phase toward the oil-water interface. As is the case with parallel plates illustrated in FIG. 1, the second overflow baffle may be made from a copper-based hydrophobic material to further enhance the aggregation rates of oil droplets.

Figure 3:
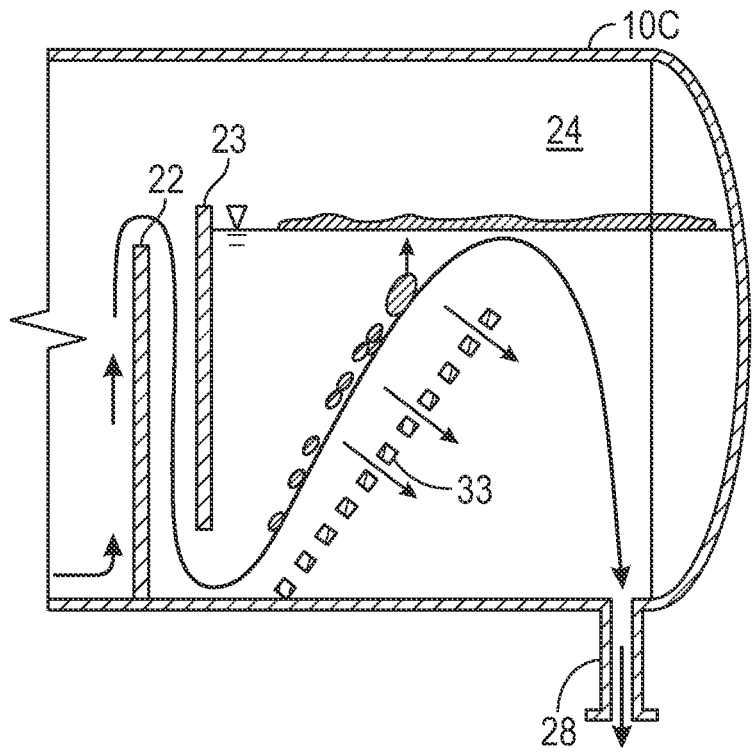
FIG. 3 is an illustration of one end of a third embodiment WOSEP with an alternate baffle arrangement under flow conditions according to one or more embodiments disclosed.

FIG. 3 is an illustration of one end of a third embodiment WOSEP with an alternate baffle design under flow conditions according to one or more embodiments disclosed. Vessel 10C may be configured to use a second overflow baffle similar to the embodiment illustrated in FIG. 2, but the baffle may be made of a mesh structure. As illustrated, the bulk fluid flowing under the first underflow baffle 23 may be directed toward a second overflow baffle 33. As with the second overflow baffle 31 in FIG. 2, the second overflow baffle 33 may be disposed at an angle in the surge compartment 24.

In one or more embodiments, the structure of the second overflow baffle 33 may be made of a copper-based hydrophilic mesh. Such a mesh material may allow water to pass through but not small oil droplets. The mesh may be woven or non-woven, and may be layered in single layer or multiple layers. The mesh opening size may depend on the droplet target size. For example, the mesh size may be between 5 and 2000 um. This may allow for oil to accumulate on the leading surface of the mesh more rapidly than on a flat plate. The oil droplets may agglomerate on the surface of the mesh, form larger droplets, separate from the surface, and rise toward the oil-water interface for collection and disposal. The mesh may also function as a traditional baffle that may facilitate a narrowly distributed fluid flow pathway and prevent short-circuiting.

Figure 4:
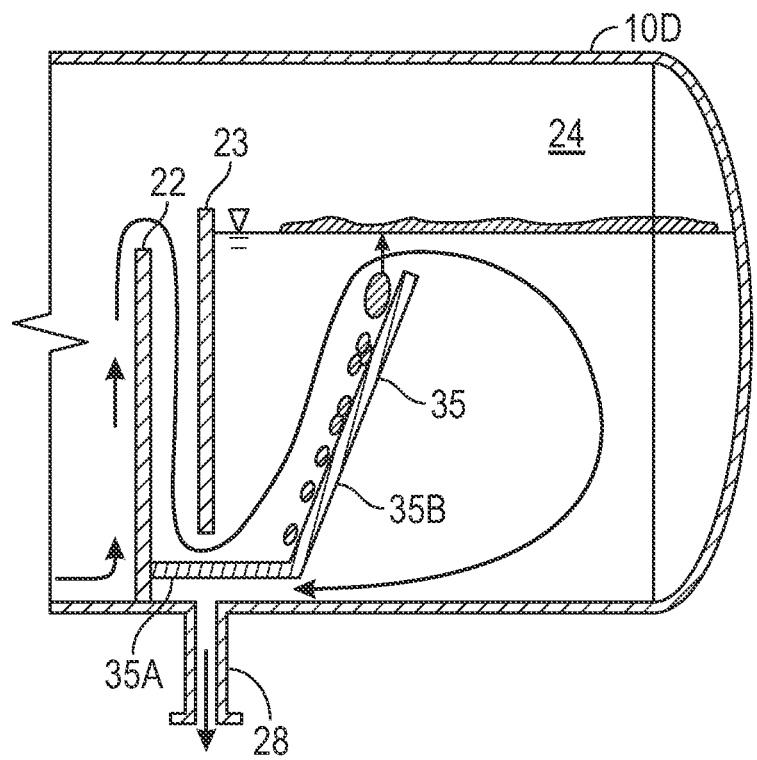
FIG. 4 is an illustration of one end of a fourth embodiment WOSEP with an alternate baffle arrangement under flow conditions according to one or more embodiments disclosed.

FIG. 4 is an illustration of one end of a fourth embodiment WOSEP with an alternate baffle design under flow conditions according to one or more embodiments disclosed. Vessel 10D may be configured similarly to those illustrated in FIG. 2. A second overflow baffle 35 may be disposed at an angle in the surge compartment 24 in order to improve the flow path of the bulk fluid. Unlike the embodiments in FIG. 2, the second overflow baffle 35 may have a first portion 35A and a second portion 35B.

The first portion 35A of the second overflow baffle 35 may be coupled to the first overflow baffle 22 at a level above a bottom of the vessel 10D while also below a bottom end of the first underflow baffle 23. The first portion 35A of the second overflow baffle 35 may also traverse under the first underflow baffle 23 at an angle that may be substantially perpendicular to the first overflow baffle 22. The first portion 35A of the second overflow baffle 35, being elevated above the bottom of the vessel 10D may create a region of the surge compartment 24 below the first portion 35A of the second overflow baffle 35 and above the bottom of the vessel 10D.

The second portion 35B of the second overflow baffle 35 may be coupled to the first portion 35A at a location downstream in the flow direction of the first underflow baffle 23. The second portion 35B of the second overflow baffle 35 may also be disposed at an angle similar to the embodiments of FIG. 2. Further, the second overflow baffle 35 may also be made of the same, or similar, copper-based hydrophobic material that may allow for oil to agglomerate on the surface.

Further, the water exit port 28 may be positioned in the region of the surge compartment 24 below the first portion 35A of the second overflow baffle 35 and above the bottom of the vessel 10D. By disposing the water exit port 28 in this region, the fluid flow length in the surge compartment 24 may be significantly increased, leading to a narrowly distributed residence time, increased flow capacity, and improved water-oil separation.

Figure 5:
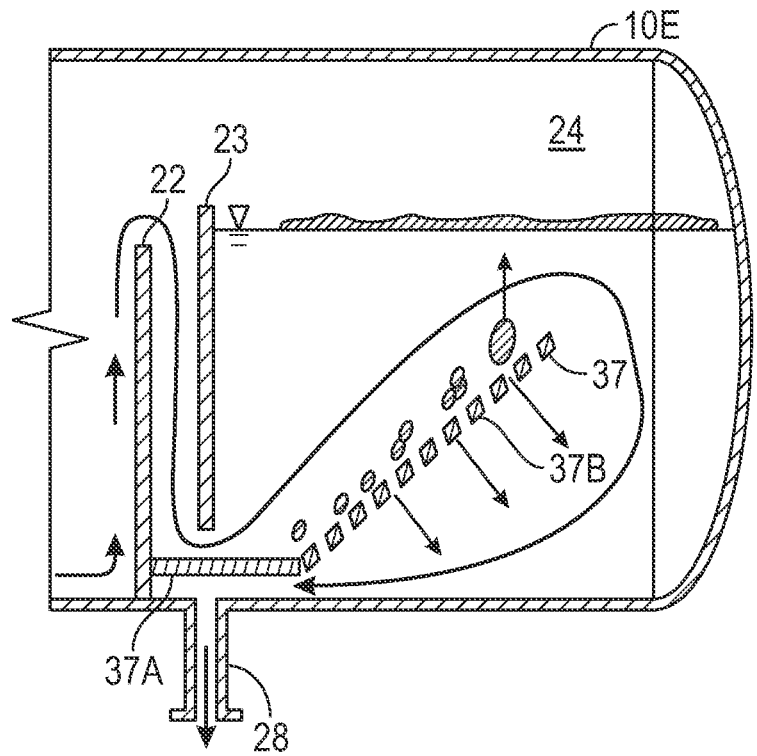
FIG. 5 is an illustration of one end of a fifth embodiment WOSEP with an alternate baffle arrangement under flow conditions according to one or more embodiments disclosed.

FIG. 5 is an illustration of one end of a fifth embodiment WOSEP with an alternate baffle design under flow conditions according to one or more embodiments disclosed. Vessel 10E has a configuration that may use a two-part baffle structure similar to the embodiments described with respect to FIG. 4 where a second overflow baffle 37 may be disposed in the surge compartment 24. The second overflow baffle 37 may have a first portion 37A attached to the first overflow baffle 22, and a second portion 37B disposed at an angle relative to the first portion 37A. Further, the first portion 37A of the second overflow baffle 37, the second portion 37B of the second overflow baffle 37, or both portions, may be made of a copper-based, hydrophilic/oleophobic mesh that may be the same or similar to that disclosed in the embodiments described with respect to FIG. 3.

The mesh structure of the second overflow baffle 37 may allow water to pass through but not the oil droplets. The water exit port 28 may also be located below the first portion 37A of the second overflow baffle 37. The combined arrangement of the second overflow baffle, the mesh structure, and the water exit port may allow for improved water-oil separation, a narrowly distributed residence time, and may prevent short-circuiting.

Figure 6:
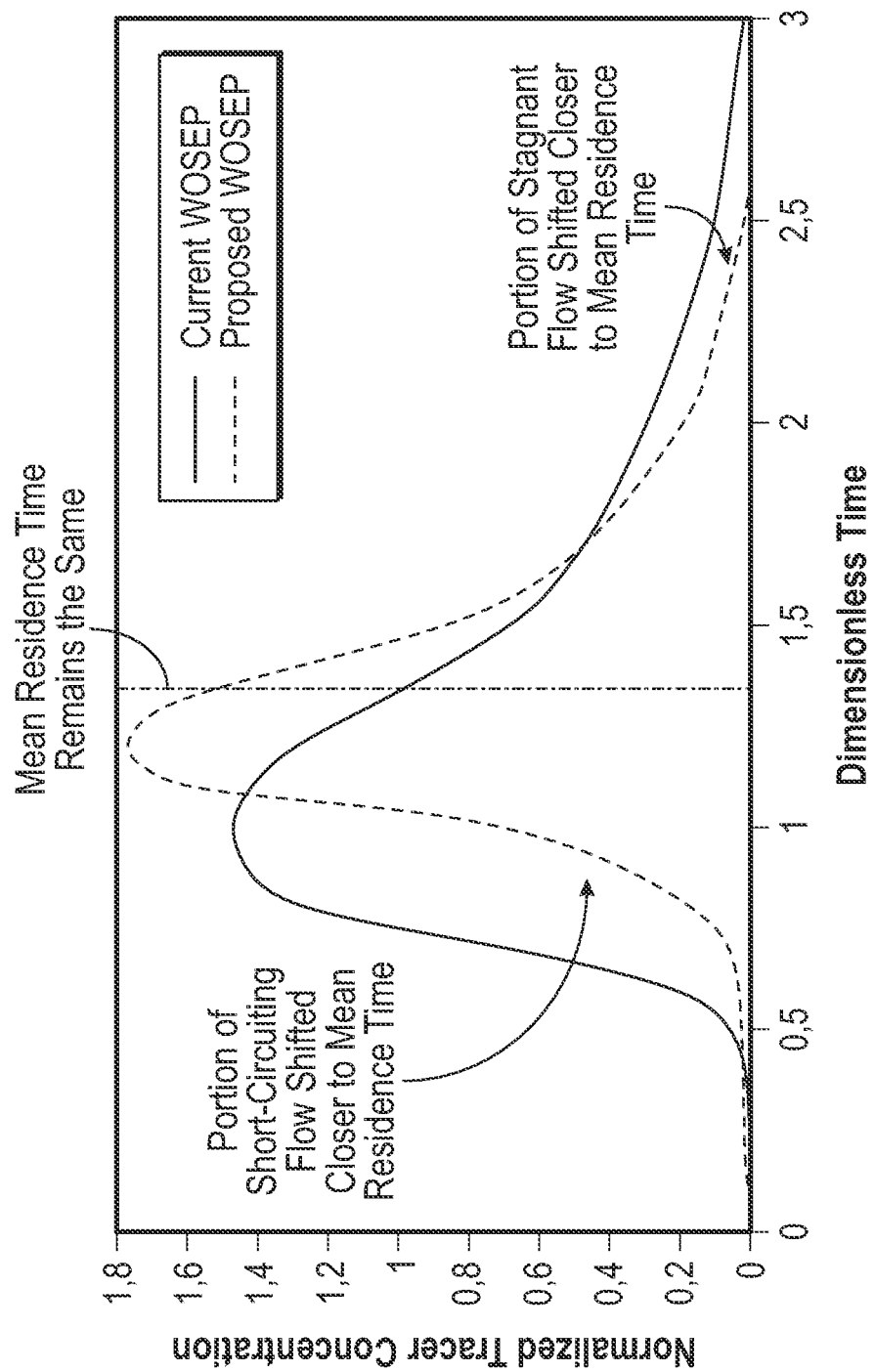
FIG. 6 is a graph that illustrates the water residence time distribution of the WOSEP as shown by the normalized concentration of a tracer or marker of the water phase released from the inlet and measured at the WOSEP outlet as a function of time according to one or more embodiments disclosed.

FIG. 6 illustrates a graph of the normalized tracer concentration of water exiting the WOSEP as a function of time, or the residence time distribution, according to one or more embodiments disclosed. The solid line shows the normalized tracer concentration of the water phase exiting the WOSEP as a function of time in a traditional WOSEP showing a wider distribution of the residence time. The dashed line shows the normalized tracer concentration of the water phase separated as a function of time after incorporating the improved baffled design according to one or more embodiments disclosed. The dashed line shows a more narrowly distributed residence time.

By improving the separation and changing the flow path of the bulk fluid, the overall residence time will not change. However, the fraction of the produced water stream that exits the WOSEP before the mean residence time is reduced. Further, by reducing short-circuiting and stagnant zones within the surge compartment, the fraction of the produced water stream that exits the WOSEP early in the process and late in the process may be reduced. The less time the water resides in the WOSEP there is less time for the oil dispersed in that water to be separated by gravity from the produced water stream. This may have the effect of shifting the portions of extreme short- and long-residence times toward the mean residence time. This may allow for the WOSEP to produce a more consistent water product in a more consistent amount of time while maintaining acceptably low levels of oil in the produced water by giving more or less similar time for separation of the dispersed oil from the produced water stream.

Advantageously, the water handling capacity in the WOSEPs may be increased or the water outlet quality may be improved.

As previously described, the improved baffle designs according to one or more embodiments disclosed may be disposed in conventional WOSEPs. These WOSEPs may be symmetrical, dual flow direction vessels or may be non-symmetrical, single flow direction vessels. Further, the improved baffle designs may be disposed in a vessel with or without a primary oil skimming baffle. In one or more embodiments, a new WOSEP may also be constructed with the improved baffle design incorporated during construction.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. An oil-water separation system comprising:
   a vessel configured to receive an oil-water mixture and to pass a treated water, wherein the treated water comprises a lower concentration of oil than the oil-water mixture;
   a first overflow baffle configured to direct the oil-water mixture fluid flow over the first overflow baffle;
   an oil collector upstream of the first overflow baffle configured to skim and recover a portion of the oil upstream of the first overflow baffle;
   a first underflow baffle positioned downstream along a fluid flow pathway of the first overflow baffle and configured to direct the oil-water mixture fluid flow under the first underflow baffle; and
   a second overflow baffle comprising:
   a first portion being attached to the first overflow baffle at a level above a bottom of the vessel and below a bottom end of the first underflow baffle, and
   a second portion disposed at an acute angle of less than 90 degrees from horizontal coated in a copper-based hydrophobic material positioned downstream along the fluid flow pathway of the first underflow baffle, configured with a mesh having a plurality of perforations, and configured to direct fluid flow over the second overflow baffle and through the plurality of perforations wherein oil agglomerates upwards; and wherein the second overflow baffle permits a water portion of the oil-water mixture to traverse through the mesh and an oil portion of the oil-water mixture to traverse over the mesh.

2. The system of claim 1, wherein the first overflow baffle is oriented substantially vertically in the vessel.

3. The system of claim 1, wherein the first underflow baffle is oriented substantially vertically in the vessel.

4. The system of claim 1, wherein the second overflow baffle is disposed at an angle relative to the first underflow baffle.

5. The system of claim 4, wherein the second overflow baffle comprises a hydrophilic-oleophobic material, the hydrophilic-oleophobic material permitting a water portion of the oil-water mixture to traverse through the mesh and an oil portion of the oil-water mixture to traverse over the mesh.

6. The system of claim 5, further comprising an oil skimming trough disposed above the second overflow baffle and configured to collect an oil portion of the oil-water mixture as the oil rises over the second overflow baffle.

7. The system of claim 1, wherein the first overflow baffle and the first underflow baffle are substantially parallel and allow for a narrowly distributed residence time of the oil-water mixture within the vessel.

8. The system of claim 1, further comprising a water exit port disposed at a lower portion of the vessel and downstream along a fluid flow pathway of the second overflow baffle.

9. An oil-water separation system comprising:
a vessel configured to receive an oil-water mixture and to pass a treated water, wherein the treated water comprises a lower concentration of oil than the oil-water mixture;
an oil collector upstream of a first overflow baffle configured to skim and recover a portion of the oil upstream of the first overflow baffle;
a first overflow baffle configured to direct the oil-water mixture fluid flow over the first overflow baffle;
a first underflow baffle positioned downstream of the first overflow baffle in the direction of fluid flow configured to direct the oil-water mixture fluid flow under the first underflow baffle;
a second overflow baffle coated in a copper-based hydrophobic material positioned downstream along the fluid flow pathway of the first underflow baffle wherein oil agglomerates upwards, configured to direct fluid flow over the second overflow baffle, the second overflow baffle comprising:
a first portion being attached to the first overflow baffle at a level above a bottom of the vessel and below a bottom end of the first underflow baffle, the first portion traversing under the first underflow baffle and being substantially perpendicular to the first overflow baffle; and
a second portion being attached to the first portion and being positioned downstream of the first underflow baffle in the direction of fluid flow and including a second overflow baffle section disposed at an acute angle of less than 90 degrees from horizontal; and
a water exit port located below the first portion of the second overflow baffle.

10. The system of claim 9, wherein the first overflow baffle is oriented substantially vertically in the vessel.

11. The system of claim 9, wherein the first underflow baffle is oriented substantially vertically in the vessel.

12. The system of claim 9, wherein the second portion of second overflow baffle is disposed at an angle relative to the first portion.

13. The system of claim 9, wherein the second portion of the second overflow baffle is a plate structure or a mesh structure.

14. The system of claim 13, wherein the second overflow baffle comprises a hydrophilic-oleophobic material configured to cause the oil to bead on the plate and rise to the oil-water interface layer.

15. The system of claim 13, wherein the second overflow baffle comprises a hydrophilic-oleophobic material configured to pass the water through the mesh and cause the oil to bead and rise to the oil-water interface layer.

16. The system of claim 13, further comprising an oil skimming trough positioned above the second overflow baffle configured to collect an oil portion of the oil-water mixture as the oil rises over the second overflow baffle.

17. The system of claim 9, wherein the first overflow baffle and the first underflow baffle are substantially parallel and allow for a narrowly distributed residence time of the oil-water mixture within the vessel.

18. The system of claim 9, further comprising a feed inlet distributor configured to provide the oil-water mixture to a separation compartment.

19. The system of claim 18, wherein the oil collector is configured for receiving oil separated from the oil-water mixture in the separation compartment.

* * * * *